United States Patent [19]
Colby

[11] Patent Number: 6,163,472
[45] Date of Patent: Dec. 19, 2000

[54] ELEVATOR DC MOTOR DRIVE WITH UNITY POWER FACTOR, INCLUDING REGENERATION

[75] Inventor: Roy S. Colby, Raleigh, N.C.

[73] Assignee: Otis Elevator Company, Farmington, Conn.

[21] Appl. No.: 09/310,600

[22] Filed: May 12, 1999

[51] Int. Cl.[7] .................................................. H02M 7/217
[52] U.S. Cl. .............................................. 363/127; 363/44
[58] Field of Search ............................... 363/39, 44, 125, 363/127

[56] References Cited

U.S. PATENT DOCUMENTS

| | | | |
|---|---|---|---|
| 4,648,022 | 3/1987 | Schauder | 363/159 |
| 4,697,230 | 9/1987 | Neft | 363/163 |
| 4,833,588 | 5/1989 | Schauder | 363/159 |
| 5,005,115 | 4/1991 | Schauder | 363/159 |
| 5,852,559 | 12/1998 | Li | 363/163 |
| 5,949,672 | 9/1999 | Bernet | 363/156 |
| 6,058,028 | 5/2000 | Czerwinski | 363/44 |

OTHER PUBLICATIONS

P. Nielsen, F. Blaabjerg, J.K. Pedersen: Space Vector Modulated Matrix Converter With Minimized Number of Switchings and a Feedforward Compensation of Input Voltage Unbalance, IEEE International Conference on Power Electronics, Drives, and Energy Systems for Industrial Growth, New Delhi, Jan. 1996, pp. 833–839.

D.G. Holmes, T. A. Lipo: Implementation of a Controlled Rectifier Using AC–AC Matrix Converter Theory, IEEE Transactions on Power Electronics, vol. 7, No. 1, Jan. 1992, pp. 240–250.

*Primary Examiner*—Adolf Deneke Berhane

[57] ABSTRACT

Power of three-phase AC mains is directly converted to DC power by a DC matrix converter employing insulated gate bipolar power transistors to directly connect the AC mains to an elevator DC motor for periods of time which are short compared with the period of the AC voltage, so as to continuously synthesize the desired AC voltage to the elevator motor. Filters are provided at the input and output of the DC matrix converters. Separate DC matrix converters may supply both the armature current and the field current to an elevator motor. Signals for selectively gating the power transistors are provided by converter control logic in response to a conventional phased locked loop, an elevator motion controller, and position speed and current control logic.

8 Claims, 3 Drawing Sheets

ELEVATOR DC MOTOR DRIVE WITH UNITY POWER FACTOR, INCLUDING REGENERATION

TECHNICAL FIELD

This invention relates to a direct AC/DC converter to supply controlled DC voltage to a load, such as a DC motor, while drawing sinusoidal current at unity power factor from the AC mains.

BACKGROUND ART

DC motor-driven elevators have traditionally employed Ward-Leonard motor-generator sets to convert AC power from the utility grid to the DC power required by the motor. More recently, phase-controlled thyristor bridge rectifiers have been used to convert three-phase AC from the utility grid directly to DC power. Principal disadvantages of such systems include the poor power factor of the converter requiring large ratings of input feeders and transformer, and the severe distortion of the AC power system created by the thyristor converter.

A more recent approach to achieving unity power factor and low distortion at the utility AC interface is to employ a boost converter front end to draw sinusoidal current at unity power factor from the AC mains while converting the 3-phase AC voltage to a regulated DC voltage. A PWM rectifier front end converter (boost converter) converts the 3-phase AC mains voltage to a controlled DC bus voltage, which is maintained by a DC bus capacitor bank. The power to the DC motor armature is switched via an output H-bridge, DC-PWM (pulse width modulation) converter. Additional filters are required at the input and output of the converter to limit current and voltage ripple. While fully regenerative and providing unity input power factor, the output H-bridge converter uses only one switch element pair (in each modulation period) to deliver positive current, and the other pair to deliver negative current, so each pair of switches must be rated to carry the maximum rated current of the drive. The poor utilization of the power semiconductors and the need for the DC bus capacitors result in high component cost.

A controlled rectifier fashioned by implementing only two phases of the output of a three phase AC/AC matrix converter is described in Holmes et al, "Implementation of a Controlled Rectifier Using AC-AC Matrix Converter Theory". Therein, the mathematical algorithms are too complex for real time processing in an elevator motor controller.

DISCLOSURE OF INVENTION

Objects of the invention include providing a DC motor drive drawing sinusoidal input currents, drawing currents at unity power factor, drawing current with little or no distortion which interferes with other nearby electrical equipment, eliminating the need for a DC bus capacitor, having high utilization of power semiconductors, with algorithms sufficiently simple for processing to be implemented in real time in an elevator motor controller, and capable of being realized practically in a cost-competitive fashion.

According to the present invention, the DC motor of an elevator is driven by a direct, 3-phase AC to DC matrix converter which controls switches in sequence to directly synthesize a desired average DC voltage waveform at the input terminals of the elevator motor, while simultaneously distributing the DC output current among the AC input lines as a sinusoidal waveform in phase with the AC voltage.

According further to the invention, the employment of bidirectional switches permits current to flow in either direction from AC to DC, or from DC to AC in regenerative operation, and permits flow in either direction to be accomplished with either positive or negative DC voltage polarity synthesized at the input terminals of the elevator motor.

According to the invention further, within each one of a large number of modulation periods per AC cycle, the switch-on time for each switch is simply $(1+m \cos\Theta_i)T13$, where $\Theta_i$ depends on the phase and DC terminal between which each switch is connected.

In further accord with the invention, a bidirectional, regenerative embodiment provides current drive to the rotor of a DC elevator drive motor, while an embodiment employing unidirectional switches provides current to the field winding of a DC elevator drive motor.

The present invention draws current with a unity power factor at the AC mains, and retains high quality, sinusoidal power without any distortion at the AC mains. The invention eliminates the need for a DC bus capacitor bank, and utilizes the power semiconductors effectively, thus making a power drive according to the invention cost competitive.

The difference between the direct AC-DC power converter of the invention and prior DC-PWM converters is that the prior converters created a DC power, much the same as a battery, of a fixed voltage, and then utilized some portion of the voltage, as needed, by synthesizing a correct DC voltage, on average, by means of pulse width modulation, whereas in the present case, the desired voltage at the desired current is synthesized directly from the AC voltage while retaining the sinusoidal balance of the AC input currents.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
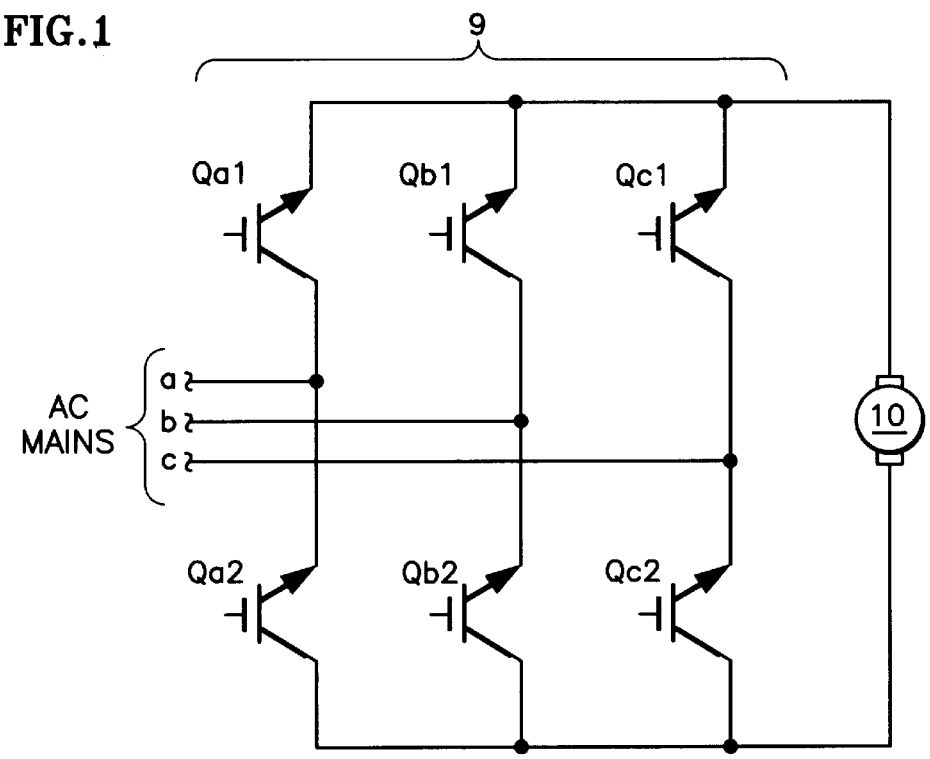
FIG. 1 is a schematic diagram of a direct AC/DC matrix converter of the invention employing unidirectional power switches, for powering a DC motor without regeneration.

A unidirectional DC matrix converter 9 is shown in FIG. 1. Six switches Qa1, Qa2, ... Qc2, that carry current in one direction only, convert three-phase AC to DC, applied to a DC motor 10.

The control of the six power switches in the DC matrix converter must follow certain constraints. The three input voltages Va, Vb, Vc on the AC mains a, b, c, are in general not equal at any given time. Hence to prevent a short circuit between two of the AC input phases, only one of the upper switches Qa1, Qb1, Qc1, and only one of the lower switches Qa2, Qb2, Qc2 may be conducting current at any instant. Continuity of current at the DC side requires that at least one upper and one lower switch must be conducting at all times. Hence it is required that exactly one upper and one lower switch be conducting at any instant.

To produce smooth DC output voltage and sinusoidal input current requires that each of the three AC phases be connected to the DC output sequentially in a period T that is short compared with the period of the AC input waveform. For example, the switching frequency may be 10 kHz for a 60 Hz AC mains frequency, resulting in switching period, T, of 100 $\mu$s. During the switching period T, the three upper switches Qa1, Qb1, Qc1 are conducting for durations Ta1, Tb1, Tc1 respectively. The switching constraints noted above require that (Ta1+Tb1+Tc1)=T. Similarly, the lower switches conduct for times Ta2, Tb2, Tc2, with the constraint that (Ta2+Tb2+Tc2)=T. The average DC voltage over the switching period T will be equal to $$Vdc=[Va(Ta1-Ta2)+Vb(Tb1-Tb2)+Vc(Tc1-Tc2)]/T$$

Similarly, the three currents in the Ac mains a, b, c relate to the DC output current, Id, as follows:

$$ia=Id(Ta1-Ta2)/T$$

$$ib=Id(Tb1-Tb2)/T$$

$$ic=Id(Tc1-Tc2)/T$$

The switching times Ta1, Ta2, etc., are selected to synthesize the desired DC voltage while maintaining sinusoidal input current at unity power factor. The AC voltages are:

$$Va=V\cos(\omega t)$$

$$Vb=V\cos(\omega t-2\pi/3)$$

$$Vc=V\cos(\omega t+2\pi 3)$$

With V=the peak line-to-neutral voltage of the AC mains, and m =a modulation index between zero and one, such that the resulting voltage on the DC side at any moment will be Vdc=m V, the switching times may be defined as $(1+m\cos\Theta_1)T/3$, for each switch as follows:

| | |
|---|---|
| Ta1 = (1 + m cos($\omega$t))T/3 | Ta2 = (1 − m cos($\omega$t))T/3 |
| Tb1 = (1 + m cos($\omega$t − 2$\pi$/3))T/3 | Tb2 = (1 − m cos($\omega$t − 2$\pi$/3))T/3 |
| Tc1 = (1 + m cos($\omega$t + 2$\pi$/3))T/3 | Tc2 = (1 − m cos($\omega$t + 2$\pi$/3))T/3 | and the AC currents will be $$ia=2/3\ Id\ m\cos(\omega t)$$

$$ib=2/3\ Id\ m\cos(\omega t-2\pi/3)$$

$$ic=2/3\ Id\ m\cos(\omega t+2\pi/3)$$

The modulation index m is determined by the motor controller to achieve the desired performance, such as acceleration, speed or torque.

With this modulation scheme, the maximum DC side voltage is limited to the peak line-to-neutral AC voltage. A more complex DC matrix switch controller is disclosed in commonly owned copending U.S. patent application Ser. No. (TO-4390). In addition, the switching sequence for Qa1, Qb1 . . . Qc2 within the switching period T may be optimized with respect to other performance metrics, such as switching losses or current balance in the filter components, while maintaining the basic performance features of undistorted sinusoidal input with unity input power factor, controlled DC output voltage, and regeneration.

Figure 2:
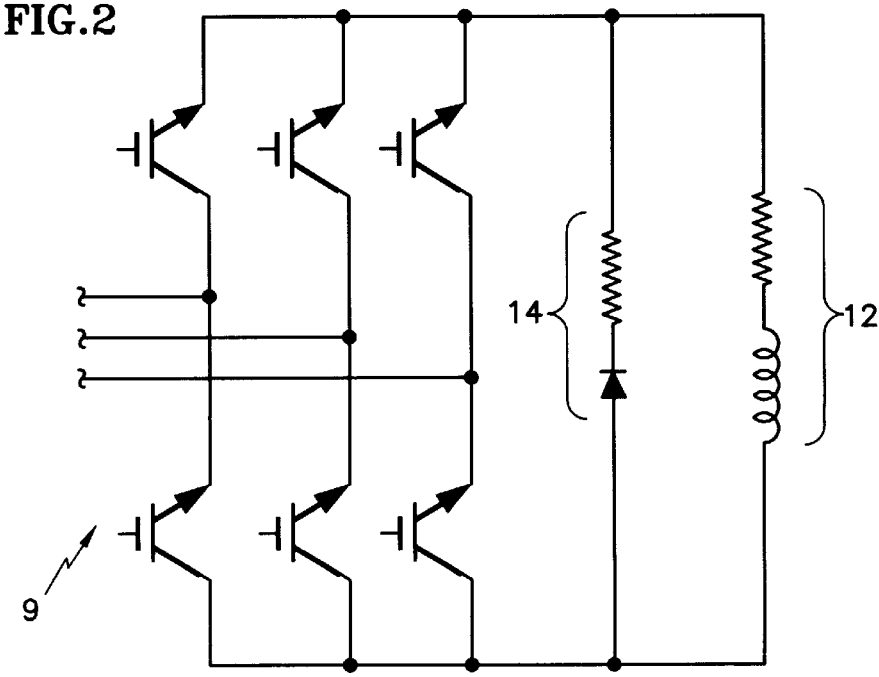
FIG. 2 is a schematic diagram of a unidirectional DC matrix converter Providing DC current to the field of a DC motor.

The DC matrix converter 9 of FIG. 1 may be used to provide current to the field 12 of a DC motor, as shown in FIG. 2. A conventional diode/resistor shunt 14 may be utilized to dissipate switching transients.

Figure 3:
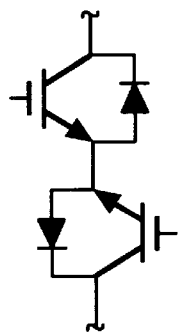
FIG. 3 is a schematic diagram of a bidirectional power switch comprising a series connection of conventional, punch-through, insulated gate bipolar transistor switches (IGBTs), each with an anti-parallel diode.
Figure 4:
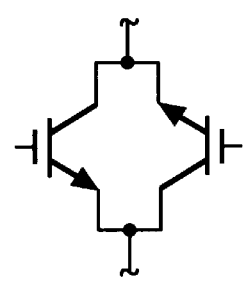
FIG. 4 is a schematic diagram of a bidirectional switch comprising an anti-parallel connection of non-punch-through, insulated gate bipolar transistor switches (NPT-IGBTs).

The unilateral power switches, Qa1, etc., depicted in FIG. 1 typically comprise punch through, insulated gate bipolar transistors (IGBTs). The IGBTs are limited in application since they can only block voltage in one direction. Therefore, a diode may have to be placed in series with each IGBT, in some applications. However, series connected IGBTs, either in a common collector configuration or the common emitter configuration shown in FIG. 3, each having an anti-parallel diode (poled for opposite conductivity) diode may be used as power switches for DC matrix converters of the invention having regeneration capability, such as is beneficial in DC elevator drive motors. More recently, non-punch-through IGBTs (NPT-IGBTs) have been developed with both forward and reverse blocking capability; these are also suited for use in the DC matrix converter of the invention. A bidirectional DC matrix converter of the invention, capable of regeneration, may comprise a pair of NPT-IGBTs connected in anti-parallel configuration (emitter to collector) as illustrated in FIG. 4. Each of the transistors in FIG. 4 will block voltage in both directions, except that, when it is forward biased, it allows current flow in its selected direction, all as is conventional.

Figure 5:
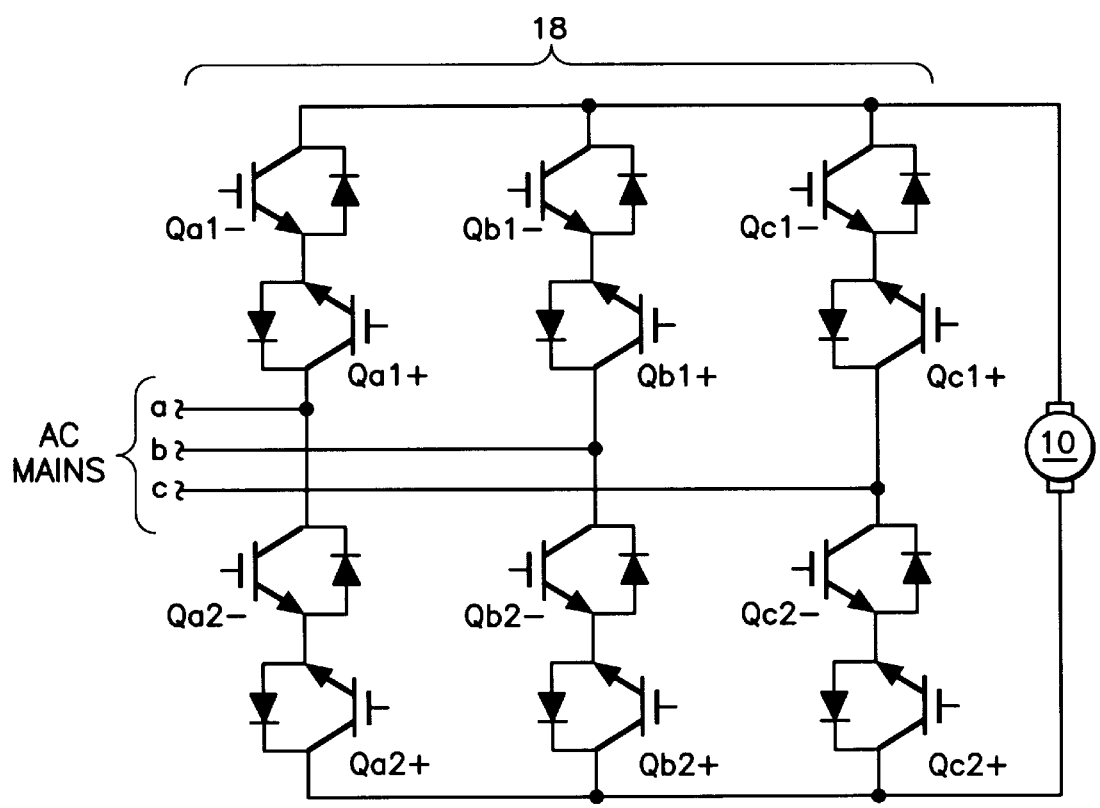
FIG. 5 is a schematic illustration of a bidirectional AC/DC matrix converter according to the invention, employing the switches of FIG. 3, to provide regeneration.

A DC matrix inverter 18 of the invention employing serial connected IGBTs is shown in FIG. 5. In FIG. 5, half of the power transistors Qa1+, Qb1+, . . . Qc2+, control the flow of current to the motor when the current to the motor is, for instance, positive, in a fashion exactly the same as described with respect to FIG. 1, hereinbefore. On the other hand, when the current through the motor 10 is negative, the other half of the power transistors, Qa1−, Qb1−, . . . Qc2−, control the flow of current to apply the generated power from the motor 10 to the AC mains A, B, C, in the same fashion as described with respect to FIG. 1 hereinbefore. The selection of the positive transistors (Qa1+, etc.) or the negative transistors (Qa1−, etc.) is made in a conventional fashion, determined by whether the motion is forward or reversed, and by whether the motor is under load (motoring) or being pushed (regenerating). As an example, in an elevator system, the motor 10 generally is regenerating power when the elevator decelerates, when the elevator is traveling upwardly with a load that is less than rated load, and when the elevator is traveling downwardly with a load which is greater than rated load. Regeneration is characterized by the motor current having opposite polarity from the motor voltage, which is easily sensed.

Figure 6:
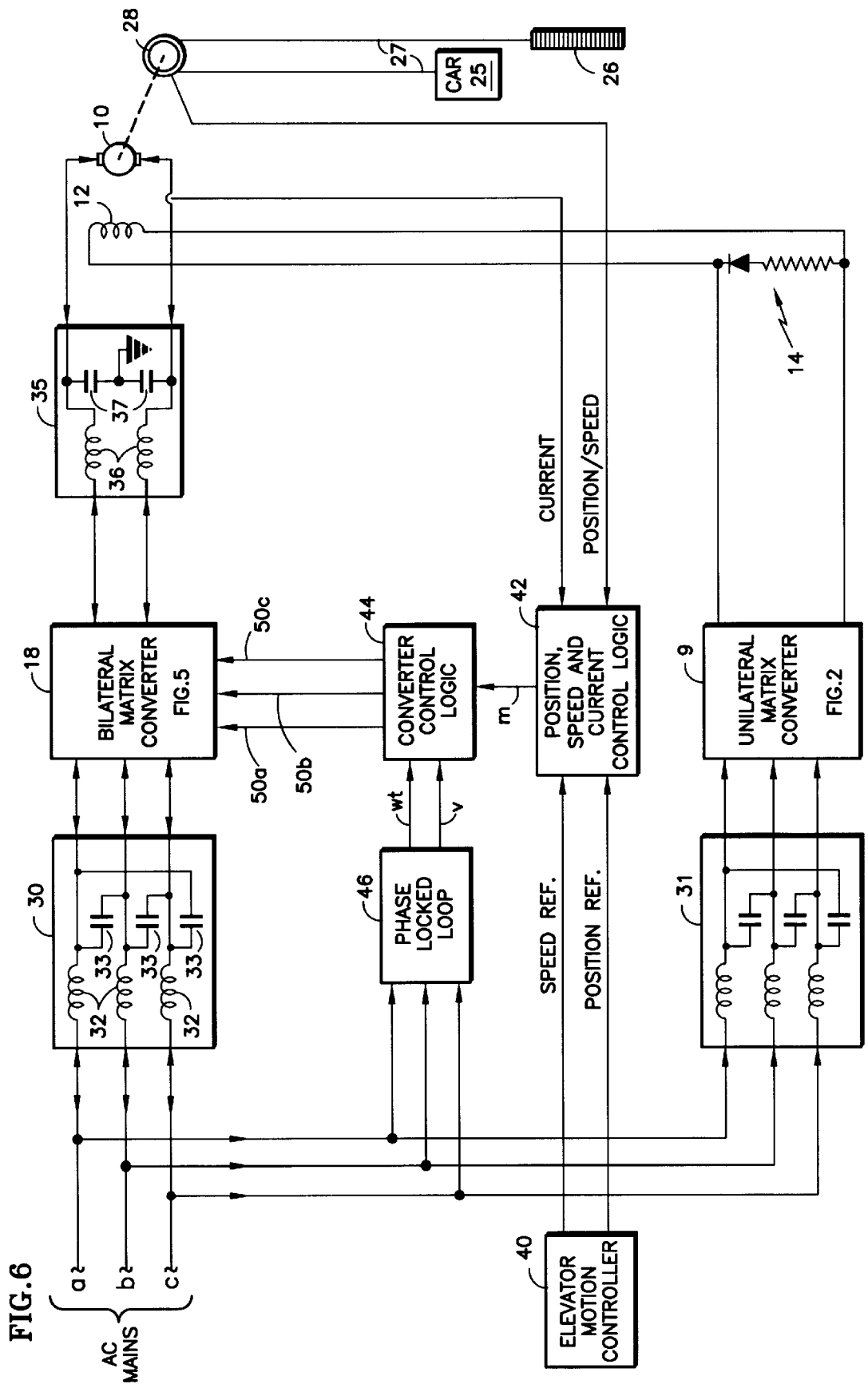
FIG. 6 is a schematic block diagram of an elevator motor control system employing AC/DC matrix converters according to the present invention.

In FIG. 6, an elevator car 25 and a counterweight 26 are connected through roping 27 to a sheave 28 connected to a DC motor 10. The motor 10 has a DC field winding 12 which is provided current from a unilateral matrix converter 9, as shown in FIG. 2. The armature of the motor 10 is provided current from a bilateral matrix converter 18 of the type shown in FIG. 5. In FIGS. 1, 2 and 5, no filters are shown; it is possible to practice the present invention with unilateral or bilateral matrix converters without adding input and output filters. However, line-to-line capacitors are required across the input mains to support switch commutation, and the use of input and output filters is preferred. For instance, the AC mains are filtered at the input to the bilateral matrix converter and the unilateral matrix converter by filters 30 and 31, respectively. Except for the size of the components, the filters 30 and 31 are identical. Each has an inline inductance 32 in each of the mains to limit the ripple in the current on the AC side, and line-to-line capacitors 33 to maintain continuity of voltage at the AC input to the DC matrix converters (18 and 9). The DC matrix converter is typically connected to the armature of the motor 10 through an output filter, comprising series inductors 36 to limit the ripple in the current at the DC motor terminals, and a shunt capacitor 37 to limit the voltage transient at the motor terminals.

The overall control of the system of FIG. 6 is provided by a conventional elevator motion controller 40, which generates an elevator motion profile determining the acceleration, the steady state speed, the deceleration, and stopping of the elevator car. To achieve this, conventional position and/or speed reference signals are provided by the motion controller 40 to conventional position, speed and current control logic 42. This typically comprises comparing the desired speed, position, and motor current with actual feedback values thereof to provide error signals which are processed by proportional and integral amplification to provide the modulation index m to the converter control logic 44. The converter control logic utilizes a phased locked loop 46 (or other known apparatus) connected to the AC mains, a, b, c to provide the phase, $\omega t$, and magnitude, V, of the voltage of the mains to the converter control logic 44. With these two inputs, the converter control logic 44 performs the calculations described with respect to FIG. 1 hereinbefore, to provide gate control signals to the power transistors Qa1+, Qa1+, . . . Qc2−, in FIG. 5, there being four separate connections in each of a group of wires 50a, a group of wires 50b, and a group of wires 50c to operate a selected pair of power transistors in FIG. 5, at any moment in time.

The invention is described using n-type transistors; however, p-type transistors may be used within the purview of the invention.

As used herein, the term "connected" and the term "connected directly" do not imply an ohmic connection, but may include filters, such as the input and output filters 30, 31, 35 herein. Instead, the terms are utilized to indicate that the voltage of the AC main is connected directly, at the same voltage, to a terminal of the DC load, and the current in the AC mains is exactly the current in the DC load.

The aforementioned article is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. An elevator system, comprising:

a DC elevator motor driving a sheave;

an elevator car and a counterweight roped to said sheave;

a DC matrix converter for directly connecting three-phase AC mains to said DC elevator drive motor, comprising a plurality of insulated gate bipolar switches, a first one of said switches connected between a first AC main and a first DC terminal of said elevator motor, and poled to conduct current in a first direction in said first main;

a second one of said switches connected between said first AC main to a second DC terminal of said elevator motor, and poled to conduct current in a second direction in said first main, said second direction being opposite to said first direction;

a third one of said switches connected between a second one of said AC mains and said first DC terminal, and poled to conduct current in said first direction in said second main;

a fourth one of said switches connected between said second Ac main and said second DC terminal, and poled to conduct current in said second direction in said second main;

a fifth one of said switches connected between a third one of said AC mains and said first DC terminal, and poled to conduct current in said first direction in said third main; and a sixth one of said switches connected between said third AC main and said second DC terminal, and poled to conduct current in said second direction in said third main;

said system further comprising a converter control logic for providing signals to cause said switches to selectively conduct for fractions of a modulation period of time which is very short compared to the period of voltage on said AC mains, to conduct current at actual line voltage, V, for variable, shared fractions of time, so as to synthesize, directly, the desired DC voltage, Vdc=mV, at said DC output terminals when they are connected to said elevator motor, while maintaining a sinusoidal current input to the DC matrix converter.

2. An elevator system according to claim 1 wherein said converter control logic turns on each of said switches for a fraction of said modulation period as follows:

said first switch, $(1+m \cos(\omega t))T/3$, said second switch, $(1-m \cos(\omega t))T/3$, said third switch, $(1+m \cos(\omega t-2\pi/3))T/3$, said fourth switch, $(1-m \cos(\omega t-2\pi/3))T/3$, said fifth switch, $(1+m \cos(\omega t+2\pi/3))T/3$, said sixth switch, $(1-m \cos(\omega t+2\pi/3))T/3$.

3. An elevator system according to claim 2 wherein each of said switches comprise an n-type insulated gate bipolar transistor.

4. An elevator system according to claim 2 wherein each of said switches comprise a series connected pair of insulated gate bipolar transistors, each transistor of said pair having a diode connected in anti-parallel configuration therewith.

5. An elevator system according to claim 2 wherein each of said switches comprise a pair of non-punch-through, insulated gate bipolar transistors connected in anti-parallel configuration.

6. An elevator system according to claim 1 wherein said switches are connected to said elevator motor through a low pass filter.

7. An elevator system according to claim 1 further comprising:

three inductors, each connected from a corresponding one of said mains to the related ones of said switches, the end of each inductor connected to said switches each also being connected through a capacitor to a like end of each other inductor, thereby forming a low three-phase, low pass filter connecting said switches to said mains.

8. An elevator system according to claim 1 further comprising:

a seventh power transistor switch connected between said first AC main and said first DC terminal, and poled to conduct current in said second direction in said first main;

an eighth power transistor switch connected between said first AC main and said second DC terminal, and poled to conduct current in said first direction in said first main;

a ninth power transistor switch connected between said second AC main and said first DC terminal, and poled to conduct current in said second direction in said second main;

a tenth power transistor switch connected between said second AC main and said second DC terminal, and poled to conduct current in said first direction in said second main;

an eleventh power transistor or switch connected between said third AC mains and said first DC terminal, and poled to conduct current in said second direction in said third main;

a twelfth power transistor switch connected between said third AC main and said second DC terminal, and poled to conduct current in said first direction in said third main; and said converter control logic providing signals to cause said first through sixth switches to selectively conduct when the current through said elevator motor is of a first polarity and providing signals to cause said seventh through twelfth switches to selectively conduct when the current through said elevator motor is of a polarity opposite to said first polarity.

* * * * *